US010719631B2

(12) United States Patent
Hu et al.

(10) Patent No.: US 10,719,631 B2
(45) Date of Patent: Jul. 21, 2020

(54) METHOD AND SYSTEM FOR DETECTING HARDWARE TROJANS AND UNINTENTIONAL DESIGN FLAWS

(71) Applicants: Tortuga Logic Inc., San Jose, CA (US); The Regents of the University of California, Oakland, CA (US)

(72) Inventors: Wei Hu, San Diego, CA (US); Ryan Kastner, San Diego, CA (US); Jason K. Oberg, San Diego, CA (US)

(73) Assignees: Tortuga Logic Inc., San Jose, CA (US); The Regents of the University of California, Oakland, CA (US)

( * ) Notice: Subject to any disclaimer, the term of this patent is extended or adjusted under 35 U.S.C. 154(b) by 163 days.

(21) Appl. No.: 15/662,216

(22) Filed: Jul. 27, 2017

(65) Prior Publication Data
US 2018/0032760 A1 Feb. 1, 2018

Related U.S. Application Data

(60) Provisional application No. 62/367,452, filed on Jul. 27, 2016.

(51) Int. Cl.
*G06F 7/04* (2006.01)
*H04N 7/16* (2011.01)
(Continued)

(52) U.S. Cl.
CPC ............ *G06F 21/71* (2013.01); *G06F 21/556* (2013.01); *G06F 21/57* (2013.01); *G06F 21/577* (2013.01);
(Continued)

(58) Field of Classification Search
CPC ........ G06F 21/71; G06F 11/22; G06F 21/556; G06F 21/57; G06F 21/6218; G06F 21/78;
(Continued)

(56) References Cited

U.S. PATENT DOCUMENTS

| | | | | |
|---|---|---|---|---|
| 4,926,476 A | * | 5/1990 | Covey | G06F 21/6218 711/163 |
| 7,159,198 B1 | * | 1/2007 | Ip | G06F 30/3323 716/106 |

(Continued)

FOREIGN PATENT DOCUMENTS

| WO | WO 2104/143912 | * | 9/2014 |
|---|---|---|---|
| WO | WO2014143912 A1 | | 9/2014 |

*Primary Examiner* — Mahfuzur Rahman
*Assistant Examiner* — Darshan I Dhruv
(74) *Attorney, Agent, or Firm* — Fish & Richardson P.C.

(57) ABSTRACT

The present disclosure includes systems and methods relating to information flow tracking and detection of unintentional design flaws of digital devices and microprocessor systems. In general, in one implementation, a technique includes: receiving a hardware design specifying an implementation for information flow in a hardware configuration; receiving one or more labels annotating the hardware design; receiving one or more security properties specifying a restriction relating to the one or more labels for implementing an information flow model; generating the information flow model; performing verification using the information flow model, wherein verification comprises verifying whether the information flow model passes or fails against the one of more security properties; and upon verifying that the information flow model passes, determining that an unintentional design flaw is not identified in the hardware design.

15 Claims, 10 Drawing Sheets

(51) Int. Cl.
- *G06F 21/71* (2013.01)
- *G06F 21/57* (2013.01)
- *G06F 21/78* (2013.01)
- *H04L 29/06* (2006.01)
- *G06F 21/62* (2013.01)
- *G06F 21/55* (2013.01)

(52) U.S. Cl.
CPC .......... *G06F 21/6218* (2013.01); *G06F 21/78* (2013.01); *H04L 63/1433* (2013.01); *G06F 2221/034* (2013.01); *H04L 63/14* (2013.01)

(58) Field of Classification Search
CPC ................................................ G06F 2221/034; H04L 63/1433; H04L 63/14
See application file for complete search history.

(56) References Cited

U.S. PATENT DOCUMENTS

| | | | | |
|---|---|---|---|---|
| 7,590,513 | B2* | 9/2009 | Jiang | G06F 11/008 703/2 |
| 7,873,953 | B1* | 1/2011 | Pritchard | G06F 30/34 717/154 |
| 9,824,243 | B2* | 11/2017 | Chen | G06F 21/85 |
| 2005/0240887 | A1 | 10/2005 | Rajski et al. | |
| 2007/0226663 | A1* | 9/2007 | Bormann | G06F 30/398 716/106 |
| 2008/0127009 | A1* | 5/2008 | Veneris | G06F 30/3323 716/103 |
| 2008/0148400 | A1* | 6/2008 | Barron | G06F 21/50 726/22 |
| 2012/0210431 | A1* | 8/2012 | Stahlberg | H04W 12/1208 726/24 |
| 2012/0278893 | A1* | 11/2012 | Jyothi | G06F 21/566 726/24 |
| 2014/0259161 | A1* | 9/2014 | Kastner | G06F 21/556 726/22 |
| 2014/0310673 | A1 | 10/2014 | Alfieri | |
| 2014/0317584 | A1 | 10/2014 | Busch | |
| 2014/0351775 | A1 | 11/2014 | Alfieri | |
| 2015/0058997 | A1* | 2/2015 | Lee | G06F 9/45558 726/26 |
| 2015/0180875 | A1* | 6/2015 | Kay | H04W 12/08 726/4 |
| 2016/0026801 | A1 | 1/2016 | Kastner et al. | |
| 2016/0098558 | A1* | 4/2016 | Vedula | G06F 21/71 726/23 |
| 2016/0098565 | A1* | 4/2016 | Vedula | G06F 21/577 726/24 |
| 2016/0162689 | A1 | 6/2016 | Martinez et al. | |
| 2017/0076116 | A1* | 3/2017 | Chen | G06F 21/85 |
| 2017/0316227 | A1 | 11/2017 | Oberg et al. | |

* cited by examiner

TABLE 2. Signal classification and labeling examples.

| Confidentiality analysis | | | Integrity analysis | | |
|---|---|---|---|---|---|
| Data type | Example | Label | Data type | Example | Label |
| Secret | Plaintext and key | HIGH | Critical | Program counter | LOW |
| Not secret | Clock, reset and start of encryption signal | LOW | Noncritical | Input from open network or keyboard | HIGH |

*FIG. 5A*

TABLE 3: Designs from trust-HUB tested using our GLIFT method.

| Benchmarks | Trojan behavior | Trigger | GLIFT logic-generation time (s) | Proof time (s) |
|---|---|---|---|---|
| AES-T100 | Leaks the key through code division multiple access (CDMA) covert channel | Always on | 2 | 408 |
| AES-T1000 | Leaks the key through CDMA covert channel | Single input | 2 | 409 |
| AES-T1100 | Leaks the key through CDMA covert channel | Input sequence | 2 | 406 |
| AES-T1200 | Leaks the key through CDMA covert channel | Counter | 2 | 410 |
| AES-T400 | Leaks the key through modulated RF signal | Single input | 2 | 404 |
| AES-T1600 | Leaks the key through modulated RF signal | Input sequence | 3 | 397 |
| AES-T1700 | Leaks the key through modulated RF signal | Counter | 3 | 411 |
| RSA-T100 | Leaks the key through ciphertext | Single input | <1 | 319 |
| RSA-T200 | Replaces the key to disable encryption | Single input | <1 | 336 |
| RSA-T300 | Leaks the key through ciphertext | Counter | <1 | 991 |
| RSA-T400 | Replaces the key to leak plaintext | Counter | <1 | 841 |

FIG. 5B

METHOD AND SYSTEM FOR DETECTING HARDWARE TROJANS AND UNINTENTIONAL DESIGN FLAWS

CROSS-REFERENCE TO RELATED APPLICATIONS

This application claims the benefit under 35 U.S.C. § 119(e) of U.S. Patent Application No. 62/367,452 entitled "METHOD AND SYSTEMS FOR DETECTING HARDWARE TROJANS AND UNINTENTIONAL DESIGN FLAWS", filed Jul. 27, 2016, which is incorporated herein by reference in its entirety.

This application is related to U.S. patent application Ser. No. 15/141,392 entitled "GENERATING HARDWARE SECURITY LOGIC", filed Apr. 28, 2016, which is incorporated herein by reference in its entirety.

BACKGROUND

The present application describes systems and methods relating to information flow tracking and detection of unintentional design flaws of digital devices and microprocessor systems. In some instances the disclosed techniques and systems involve hardware security, trust and protection from unintentional design flaws, such as hardware Trojans.

In the computing environment, the presence of malicious attacks and exploited system vulnerabilities can become problematic, causing damaging effects to computer hardware components. Therefore, hardware security is becoming of increasing importance in the microprocessor and semiconductor industries. Current hardware security techniques typically utilize manual processes for implementing certain security aspects of the hardware design, for example information flow control.

Hardware design and supply can involve multiple teams spread around the world. In this distributed process, hardware may be intentionally or unintentionally built with unspecified functionality. Such undocumented modifications can provide a hidden channel to leak sensitive information or a back door for attackers to compromise a system.

In some instances, malicious attacks can include threats directly implemented via hardware components, such as Hardware Trojans. Hardware Trojans are a major security threat originating from malicious design modifications. These are carefully designed lightweight components that are activated under rare conditions, which protects them from being detected during the design phase. As a consequence, these hard-to-detect hidden time bombs are often identified only after severe damage has been inflicted.

Prior efforts to detect hardware Trojans include exhaustive testing, which becomes intractable even for moderate scale designs. More intelligent methods utilize integrated circuit test methodologies to increase the transition probability of the Troj an trigger or to identify redundant circuit with low switching probabilities. However, testing is a hard problem even when not considering intentionally difficult to activate logic. A number of methods seek to capture the Trojan behaviors using side channel signal analysis (e.g., they attempt to detect transient power and spurious delays added to the design due to the Trojan design). The increasing amount of hardware manufacturing process variation and decreases in the size of the Trojan payload can mitigate the effectiveness of these techniques.

Detecting Trojans in IP cores is an extremely challenging task. Many existing methods for detecting Trojans in IP cores rely on testing or verification methods to identify suspicious signals, e.g., those with extremely low transition probability. However, these methods may still miss certain types of Trojans, e.g., a Trojan without a trigger signal. Some methods detect Trojans by formally proving security related properties. They indicate the existence of a Trojan when a security property is violated. However, these methods typically require rewriting the hardware design in a formal language, which comes at significant design cost. Additionally, most of the existing methods may not provide clues (e.g., revealing Trojan behavior) that will help pinpoint the Trojan from the entire design.

Hardware trust is an emerging security threat due to the globalization of hardware supply chain. A major security concern is Trojan horses inserted by an untrusted party. Hardware Trojans are carefully crafted to protect them from being identified, and detecting them in third party intellectual property (IP) cores requires significant effort. This work employs information flow tracking to discover hardware Trojans. It works by identifying Trojans that violate the confidentiality and integrity properties of these hardware components. Our method is able to formally prove the existence of such types of Trojans without activating them. We demonstrate our techniques on trust-HUB benchmarks and show that our method precisely detects the hardware Trojans that violate the information flow security properties related to confidentiality and integrity.

Existing hardware Trojan detection methods generally fall into two categories: invasive and non-invasive. Invasive methods either insert test points in the design for increased observability or use reverse engineering techniques to check for malicious design modification at the physical level. These methods are relatively expensive since they require highly specialized tool for physical access to the chip layout. Non-invasive methods do not need to modify the design. They look for clues, e.g., faulty output, downgraded performance, and increased power consumption, which may reveal the existence of a Trojan. Some existing methods try to capture these clues by functional testing, while others perform circuit parameter characterization.

It may be desirable to implement a formal method for detecting unintentional design flaws, such as hardware Trojans, by proving security properties related to confidentiality and integrity.

SUMMARY

The present disclosure includes methods and systems relating to hardware security. According to an aspect, a method performed by data processing apparatus includes: receiving a hardware design specifying an implementation for information flow in a hardware configuration, wherein the hardware design comprises at least two variables relating to the information flow; receiving one or more labels annotating the hardware design, wherein each of the one or more labels corresponds to a respective variable of the at least two variables; receiving one or more security properties specifying a restriction relating to the one or more labels for implementing an information flow model; generating the information flow model, wherein generating comprises translating the one or more security properties to automatically assign a respective label value to each of the one or more labels based on the one or more security properties; performing verification using the information flow model, wherein verification comprises verifying whether the information flow model passes or fails against the one of more security properties; and upon verifying that the information flow model passes, determining that an unintentional design flaw is not identified in the hardware design.

One or more of the following advantages may be provided. The methods and systems described can employed information flow tracking techniques so as to provide gate-level logic to detect various security threats, for example hardware Trojans, which violate security properties that can be specified by designers and relating to hardware elements that may be exposed to vulnerabilities (e.g., received from untrusted sources), such as third-party IP cores. Additionally, the methods and systems described leverage a precise gate level information flow model that can be described with standard hardware description language (HDL) and verified using conventional design mechanisms (e.g., off-the-shelf electronic design automation (EDA) tools), which minimizes the additional design cost.

Details of one or more implementations are set forth in the accompanying drawings and the description below. Other features and potential advantages may be apparent from the description and drawings, and from the claims.

BRIEF DESCRIPTION OF THE DRAWINGS

FIG. 5A illustrates a table including examples of classification and labeling employed for information flow tracking.

FIG. 5B illustrates a table including example results using the techniques for detecting unintentional design flaws of FIG. 4A.

Like reference symbols in the various drawings indicate like elements.

DETAILED DESCRIPTION

Figure 1:
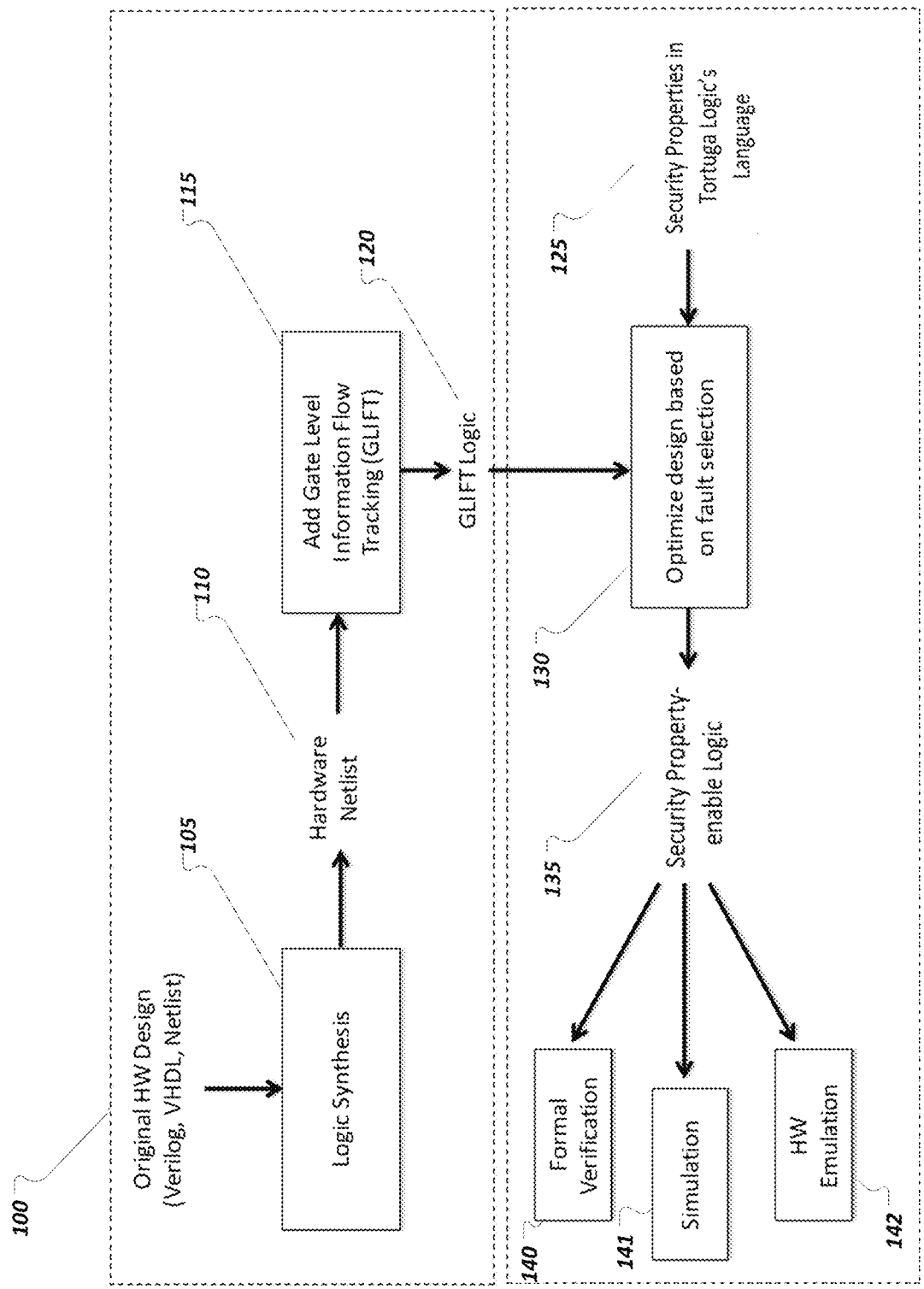
FIG. 1 illustrates an example process for implementing information flow tracking.

Information flow tracking (IFT) is a technique usable in secure systems to ensure that secrecy and/or integrity of information is tightly controlled. Given a policy specifying the desired information flows, such as one requiring that secret information should not be observable by public objects, information flow tracking helps detect whether or not flows violating this policy are present.

In general, information flow tracking associates data with a label that specifies its security level and tracks how this label changes as the data flows through the system. A simple example system has two labels: public and secret. A policy for the example system specifies that any data labeled as secret (e.g., an encryption key) should not affect or flow to any data labeled as public (e.g., a malicious process). Information flow tracking can also be extended to more complex policies and labeling systems.

Gate Level Information Flow Tracking (GLIFT) is an information flow tracking technology that provides the capability for analyzing the flow of information in a hardware design by tracking the data as it moves throughout the system. GLIFT can be applied, for example, after a design is synthesized into a gate-level netlist. With GLIFT, each gate is then associated with tracking logic. The function of the tracking logic depends on the function of the gate. The process is similar to a technology mapping, where each gate in the system is mapped to specific GLIFT logic. The result is a gate-level design of a finite state machine (FSM) that contains both the original logic and tracking logic. The resulting design equipped with tracking logic can be tested for information flows. To test for implicit timing flows, GLIFT accounts for all possible combinations of tainted data bits, and allows information flows to be observed. A designer can than make appropriate modifications to the chip design. Since GLIFT targets the lowest digital abstraction, it is able to detect and capture information leaking through time. However, GLIFT fails to provide any ability to separate timing information from functional information. Accordingly, a hardware designer using GLIFT would be unable to determine with a suspect flow is direct or indirect.

As disclosed in detail herein, the techniques of information flow tracking can be further leveraged for detection of unintentional design flaws, such as hardware Trojans that violate confidentiality and integrity of critical data. Various implementations involving employing information flow tracking, for example GLIFT, for hardware security mechanisms are disclosed in U.S. patent application Ser. No. 15/141,392 entitled "GENERATING HARDWARE SECURITY LOGIC", filed Apr. 28, 2016, which is incorporated herein by reference in its entirety.

In the techniques and systems disclosed, the information flow tracking capabilities of information flow tracking technologies, such as GLIFT, generate a gate-level logic, for instance a security logic, that can passed to a verification process to capture harmful flows of information and further reveal any malicious design flaw behaviors (which can assist backtracking analysis in order to identify the location of malicious design). Additionally, disclosed techniques can detect specific types of attacks, such as specified Trojans, that can cause leakage of sensitive information and violation of data integrity.

FIG. 1 illustrates an example process for implementing information flow tracking. For purposes of illustration, GLIFT is shown in FIG. 1 and correspondingly described. However, various information flow tracking technologies using gate-level logic can be used as deemed necessary and appropriate. A hardware design is received 100 that can be employed in integrated circuit (IC) technology, such as fabrication of a Complimentary-Metal-Oxide-Semiconductor (CMOS) or silicon germanium (SiGe) die. Additionally, implementing a hardware design is not limited to physical chip fabrication in some embodiments, and can involve various other mechanisms for realizing and/or executing the hardware circuitry, such as Field Programmable Gate Arrays (FPGAs), graphics processors, and general-purpose processors. In some implementations, the hardware design is received as an original design that can be further translated into a hardware design that is enabled for information flow analysis. In the implementations, receiving the hardware design can involve specifying an implementation for an electronic circuit or microprocessor for example, including the components, connectivity, flow of information between components, and logical arrangements. The hardware design can describe the circuit using various degrees of abstraction, including but not limited to: gate level, Register Transfer Level (RTL) level, algorithmic level, and behavioral levels. In some implementations, the hardware design can be received as a program received in, or otherwise including, a hardware description language (HDL), such as Verilog, SystemVerilog, Very High speed integrated circuit Hardware Description Language (VHDL), and Netlist for example. Thus, a hardware designer, for example, can employ a suitable HDL for generating the hardware design, and subsequently electronically communicating that hardware design to a processing apparatus for further analysis and synthesis.

In some implementations, at least a portion of the received hardware design is synthesized to gate level primitives, for example, in a logic synthesis process 105. Synthesis 105 can be a process for generating the low level hardware components, such as the gate level primitives. Thus, a result of performing synthesis 105 on the received hardware design can be constructing a hardware netlist 110 from the implementation specified in hardware design. The hardware netlist can be generated at the gate level and including a description of the connections within the hardware design. As an example, the generated netlist consists of a list of the terminals of the electronic components in the circuit, and the electrical conductors that interconnect the terminals. In some implementations, the hardware netlist is not optimized according to area and timing constraints associated with the circuit.

Thereafter, GLIFT logic can be added 115, or otherwise inserted, into the hardware design at the gate level. GLIFT methodologies can be employed for analyzing, statically verifying, and dynamically managing the information-flow behavior for implementing a hardware security logic. For example, GLIFT implements full system information tracking at the logic gate level. GLIFT functions to associate each bit in the hardware design with a one-bit tag (e.g., taint bit), so as to indicate a corresponding security level. Additionally, GLIFT supplements each gate in the hardware netlist, for example, with additional gates used to compute a propagation of the tag in the logic. Therefore, generating the resulting GLIFT logic 120 includes logical components (i.e., bit and gates) that are adding to, or otherwise augmenting, the original hardware design, so as to implement hardware security aspects (e.g., information flow) in the logic.

In some implementations, security properties associated with the hardware design can be programmed and subsequently received in a high-level security language 125, for example Tortuga Logic's Language as illustrated in FIG. 1. In some instances, the high-level security language 125 is Sentinel, which is a Tortuga Logic Language. More details regarding Sentinel regarding its use for information tracking and hardware security mechanisms are disclosed in U.S. patent application Ser. No. 15/141,392 entitled "GENERATING HARDWARE SECURITY LOGIC", filed Apr. 28, 2016, which is incorporated herein by reference in its entirety In the implementations, security properties can be specified using a high-level security language. Although Tortuga's Logic's language, is shown as an example in FIG. 1, as an alternative other high-level security languages may be utilized as deemed necessary and/or appropriate. Accordingly, the embodiments provide the ability to configure and/or create the hardware security logic from a high-level language. As an example, a hardware engineer can program the various security properties associated with the security aspects of hardware design in a manner that may use natural language, automation, and abstraction. Thus, using a high-level language implementation for receiving security properties 125 may provide a process of developing a hardware security logic that is simpler and more understandable in comparison to some earlier generations of secure hardware design languages. Moreover, programming security properties in a high-level language may realize increased expressiveness, ease of design, and implementation efficiency.

Security properties can be utilized for describing, and subsequently enforcing, information flow security in hardware design. In some implementations information flow restricts how information can flow through a hardware logic, and considers a wide range of security vulnerabilities. Therefore, receiving security properties in a high-level security language 125 can involve specifying various information flow restrictions and/or constraints. As an example, security properties can identify which information cannot pass, or otherwise get leaked, into an unclassified location (e.g., confidentiality) and which critical components of the hardware cannot be affected or tampered with by untrusted sources (e.g., integrity). In the implementations, security properties received in high-level security languages can be translated, for example during RTL synthesis, into a security hardware logic, for example at the gate level.

According to an embodiment, optimizing the security logic of the hardware design 130 is performed based on the security properties programmed in the high-level security language. Optimization of the hardware security logic can involve removing circuitry that may be deemed unnecessary in the design or operation of hardware security logic. Also, optimization can include adding circuitry determined to be needed, or otherwise necessary, in the logic. Optimization determinations in the embodiments can be related to various circuit performance metrics and constraints, such as efficient execution time. Thus, the hardware security logic techniques according to the embodiments generates hardware security logic that implements an optimized version of the security logic. Additionally, the implementations may provide the advantages of a reduced circuit area for the hardware security design, such as decreasing space used on a semiconductor chip and reducing propagation delay.

The generated hardware security logic, implementing the security properties, is thereafter enabled 135 and used for various analysis and design techniques. Thus, enabling the hardware security logic can involve additional techniques so as to further analyze, test, and construct the hardware security logic. In some implementations, enabling the hardware security language 135 can involve compiling, so as to translate a logic into a format employed by the analysis and design functions, for example an emulation system. As an example, the analysis and design techniques can be employed to verify that the function of the resulting hardware logic is consistent with one or more security property restrictions. The logic analysis functions performed using the hardware security logic can include, but are not limited to: formal verification 140; simulation 141; hardware emulation 142; and fabrication 143.

In some embodiments, formal verification 140 can include passing the hardware security logic to a formal solver, for example, in order to determine whether any behavior of the logic fails, or otherwise violates, a specified security property. In other implementations, static information flow security verification is performed in formal verification 140. Formal verification 140 can include a design-time verification of some time-sensitive security properties. In some alternative embodiments, compile-time verification of implemented information flow properties can be employed. According to the disclosed techniques, formal verification 140 can verify the generated hardware security logic against specified security properties that can be checked by formal tools to identify unintentional design flaws (e.g., hardware Trojans that violate the security properties). Details for implementing unintentional design flaw detection via verification is disclosed herein, for example in reference to FIG. 4A.

Additionally, the security hardware can also be communicated to a simulator, for example, configured to perform simulation 141. The simulation 141 can include employing a series of input tests, where values associated with particular input variables of the hardware design are applied to the logic. Subsequently, the behavior of the hardware security logic design is simulated for a duration, such as multiple design clock cycles, so as to observe and/or detected any security property violations in the simulated behavior.

The hardware (HW) emulation 142 techniques can receive the hardware security logic so as to emulate the behavior of the circuit. HW emulation 142 can provide faster execution of circuit behavior simulations in an embodiment, and thereby may be better suited for debugging than simulation 141, for example.

Also, the hardware security logic can be used in circuit fabrication 143, and thereby employed in construction of one or more physical IC chips. For example, fabrication 143 can involve creating circuit prototypes that are built from physical hardware components, such as a number of FPGAs. According to this embodiment, fabricated IC chips can be used for detection of security property failures, or any additional hardware security violations, in the field of use, for example embedded in a computing system. Moreover, any additional semiconductor and computing techniques that may deemed suitable for testing, evaluating, and analyzing the generated hardware security logic can be applied as one or the various logic analysis functions performed using the hardware security logic.

Figure 2:
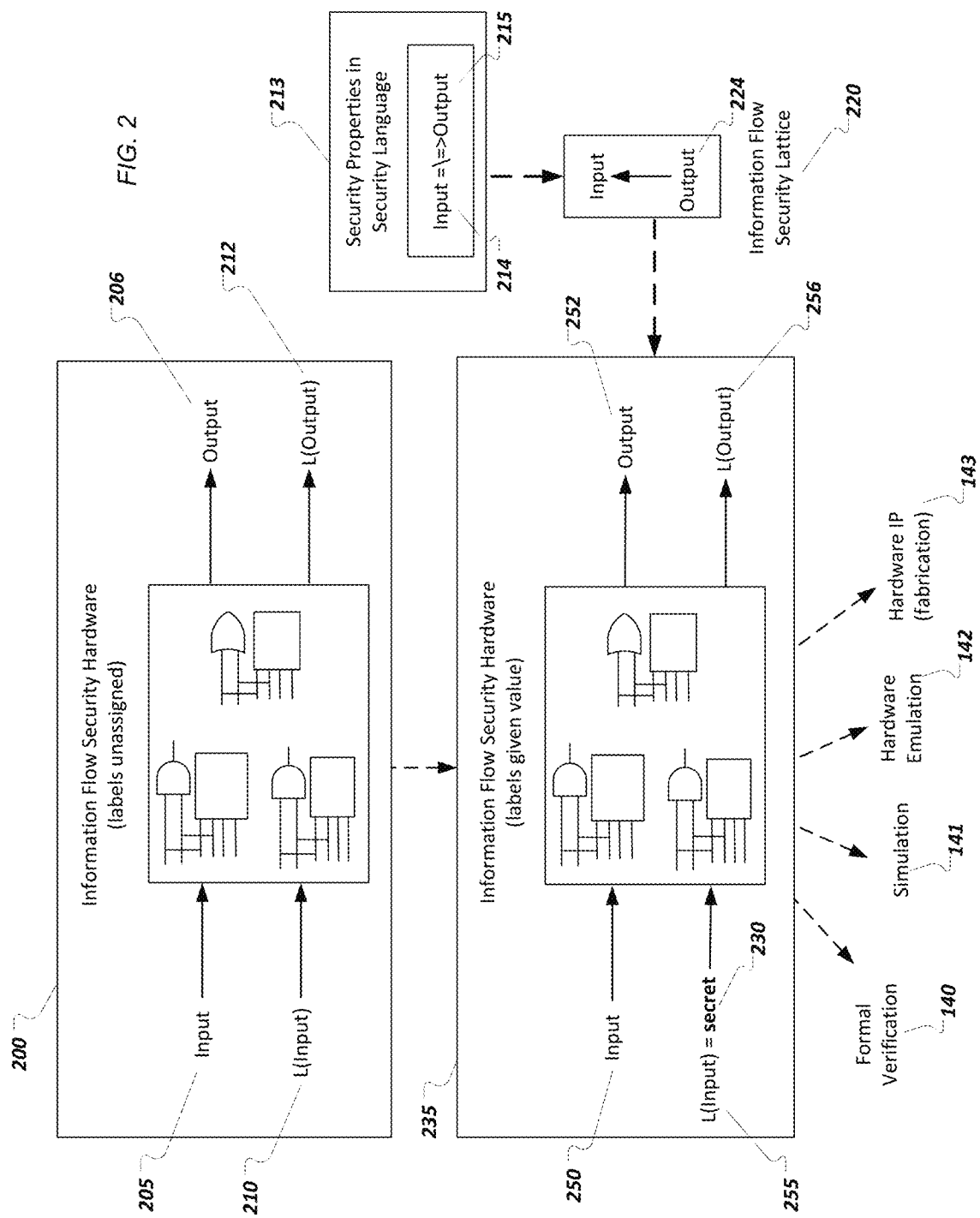
FIG. 2 illustrates an example of a process for implementing a Gate Level Information Flow (GLIFT) logic for information flow tracking.

FIG. 2 illustrates an example process for implementing a hardware security logic using a high-level security language. The constructive process shown in FIG. 2 includes a hardware security design 200 that can be a dedicated portion of a hardware design for implementing the secure information flow, for example. In some embodiments, the hardware security design 200 can be a logic specified at the gate level, and generated according to the techniques previously described in connection with FIG. 1. For example, the hardware security design 200 can be implemented as a GLIFT logic. According to the embodiments, the hardware security design 200 can include a set of inputs 205 and outputs 206 corresponding to input ports and output ports, respectively, included in the configuration of the hardware security logic. Additionally, in some implementations, the inputs 205 and outputs 206 can be represented as one or more variables used in mechanisms for specifying a hardware design, for example a HDL.

Additionally, the variables can be further associated with security labels 210, 212. As shown in FIG. 2, a security hardware design 200 is annotated with security label 210 that corresponds to an input. Also, label 212 corresponds to an output of the hardware design. It should be appreciated that one or more security labels can be appropriately associated with any hardware element, or variable, specified in a hardware design as deemed suitable. In some implementations, the labels 210, 212 can be utilized as annotations to the specified hardware design. Accordingly, the labels 210, 212 can be applied to augment a security hardware design 200 in HDL, for example, with more natural language descriptive terms for the components, data, and connectivity within the hardware logic. In the embodiments, at least one label is including in the hardware security design 200. As an example, the hardware security design 200 may include a security label of "key_signal" that can be associated with, or otherwise represent, an encryption key. Therefore, implementing security labels 210, 212 may realize certain benefits associated with high-level programming language techniques applied to designing security hardware logic, and thereby may increasing ease of design in the embodiments.

According to the implementations, security properties for a hardware design can be received in a high-level security language 213. Implementing techniques for employing a high-level programming language for specifying secure information flow and/or security properties are described in connection with FIG. 1. In the implementations, information flow control mechanisms can operate to associate the security labels 210, 212 with the data and the hardware components, or resources, within the hardware security design 200. For example, security property 213 includes labels 214, 215 and specifies a hardware-level information flow. The security property 213 specifies a particular restriction to implement a secure information flow within a hardware design. As shown in FIG. 2, the security property 213 can be specified in an expression implemented in a high-level security language, for example, "Input=/=>Output", which checks an information flow between source (e.g., Input) and destination (e.g., Output). The security property 213 illustrated in FIG. 2 defines, or otherwise specifies the information flow restriction, that Input should not flow to Output. In some embodiments, the high-level security language can implement various variables, objects, complex arithmetic or Boolean expressions, subroutines and functions for defining security properties. As an example, Sentinel language can specify labels, signals, registers, expressions, conditionals, logical operators, and keywords, allowing for a high-level implementation of information flow.

In some embodiments, security properties 213 specifying information flow restrictions for a hardware design can be further specified as one or more security lattices 220. The security lattice 220 can be an ordering structure including the labels 214, 215 specified in the security property 213. Moreover, security lattice 220 can specify a hierarchical order for the labels 224, 225 included therein. Moreover, the hierarchical order within the security lattice 220 indicates security levels with respect to the security labels 224, 225. The security levels can be determined from security lattice 220, where the ordering, or partial ordering, indicates which information flows are secure.

In an embodiment, the ordering levels of a security lattice 220 are arranged in a "bottom-up" hierarchical configuration, that is, information flows are allowed to higher elements in the lattice. For instance, labels 224, 225 are arranged in a hierarchical order corresponding to the label's restrictiveness, as defined in the security property, in relation to another label. As an example, the labels 224, 225 are arranged within security lattice 220 in a manner such that "input" associated with a label 224 is placed higher in the security lattice 220 (e.g., HIGH), and is thus defined as more restricted (i.e., can flow to fewer places) than "output" associated with label 225, which is lower in the structured order (e.g., LOW). Therefore, security labels 224, 225 can be designated with a corresponding security level based on the order (e.g., HIGH or LOW) of each label within security lattice 220. In some implementations, a security level can be assigned, or otherwise associated with each level of the security lattice 220. Alternatively, in some embodiments, various other data structures that may be suitable for ordering and/or indicating a hierarchical order can be utilized in place of, or in addition to, security lattice 220. One or more security lattices 220 can be employed for implementing each respective security property 213 defined for the information flow control of a security hardware design 200. In other embodiments, a security lattice 220 can implement more than one security property 213.

As an example, the structure of security lattice 220 includes a two label hierarchical arrangement indicating that Output, label 225, flowing to Input, label 224, is a secure information flow that is allowed according to the security property 213. A violation of the security property 213 can include a conversely occurring instance of Input, which is the more restricted label 224, flowing to Output label 225. Accordingly, in some implementations, a security hardware logic implementing an information flow violating one or more specified security properties 213 can be detected. Moreover, in the example, label 224 can be designated to the corresponding security level of "secret", in accordance with the hierarchical order specified in the security lattice 220. Therefore, the security lattice 220 can be employed to identify, or otherwise define, security label/security level associations, based on the security properties 213. One or more security levels employed in the security lattice 220 can include, but are not limited to, unclassified, secret, top secret, for example.

In some embodiments, a security lattice 220 is optionally employed. Thus, downstream implementation operations for configuring the hardware can be realized directly from the security properties 213 as specified in the high-level security language, and without requiring the creation of a security lattice 220. According to the implementation, the high-level security language can be employed as the mechanism for mapping to security labels of a hardware design. For example, operations defined by the high-level security language can be mapped to labels of a hardware design, thereby translating the hardware design into a logic that is enabled for information flow analysis. In some implementations, a backend approach is utilized for information flow analysis, in which various information flow analysis platforms can be applied to the hardware configuration subsequent to implementing the security aspects of the hardware design via the high-level security language. For instance, implementing security aspects of the hardware design, according to the embodiments, is accomplished using Sentinel. Thereafter, GLIFT is employed as a security platform to implement information flow analysis on the hardware configuration.

Thereafter, the embodiments can function to automatically assign a value to each respective label in a logic design that corresponds to a security label/security level association indicated by the generated security lattice 220. In an implementation, the security hardware design 200 can be augmented with the particular value 230 assigned to each security label 255 corresponding to a security level. As displayed in FIG. 2, label 255 is assigned a value associated with "secret" within the hardware security logic 235. For example, a GLIFT logic that employs a one-bit tag, or label, can be automatically augmented by setting the labels corresponding to "secret" security level to 1. Thus, the resulting hardware security logic 235 includes labels that are assigned to values, and logical outputs associated with security levels.

The hardware security logic 235 also includes variables 250,252 and label 256 that is not assigned a value. Thus, according to some implementations, values 230 are assigned to a portion of the labels and/or variable present in the hardware design. In the implementation, values can be automatically assigned to every bit corresponding to a security label within a hardware security design. Also, in some implementations, a security level can be automatically assigned to each logic gate of the tracking logic implemented using various secure hardware design techniques. In some techniques, hardware designers manually specify the security labels and associated values in a security hardware design, which may exacerbate programming (and debugging) difficulties in the design processes. The process of manually editing and/or annotating a hardware design, which at the gate-level for a complex design, for example, can be cumbersome and difficult to configure. The embodiments implement a technique that enforces information flow security in the hardware security logic 235, while providing an automated solution that overcomes the challenges associated with manual aspects of security hardware designs.

In an implementation, the values for security labels are computed, or otherwise evaluated, and inserted into the hardware security logic during synthesis. A synthesizer, or logic synthesis tool, can be employed to insert bits and/or logic into the hardware design, for example, to achieve the automated aspects of the embodiments. Thus, a synthesizer can be employed to translate the logic operations specified in security properties 213 and/or the security lattice 220 implemented using high-level security language into a synthesizable hardware design configured to implement secure information flow. In some embodiments, a compiler can be additionally employed to support an automatic translator capability used to translate programmed code in a high-level security language into a HDL.

In accordance with the various implantations disclosed, the abovementioned information flow tracking technologies can be utilized for hardware trust aspects of design. Hardware trust is an emerging security threat due to the globalization of hardware supply chain. A major security concern is attacks that can cause unintentional design flaws, for instance Trojan horses, can be inserted by an untrusted party. Hardware Trojans are carefully crafted to protect them from being identified, and detecting them in third party intellectual property (IP) cores requires significant effort. The disclosed systems and techniques employ information flow tracking to discover these hardware Trojans. The techniques are capable of identifying Trojans, or other various security threats, that violate the confidentiality and integrity properties of these hardware components. The disclosed techniques are able to formally prove the existence of such types of attacks without activating them. Furthermore, the techniques can precisely detect the hardware attack, such as the specific type of Trojan, which violated the information flow security properties related to confidentiality and integrity. For purposes of illustration, the disclosure refers to hardware Trojans, however is should be appreciated that the embodiments can be configured for detecting various other security threats that serve as malicious modifications of embedded hardware (e.g., circuitry of an integrated circuit) as deemed necessary and/or appropriate.

Figure 3:
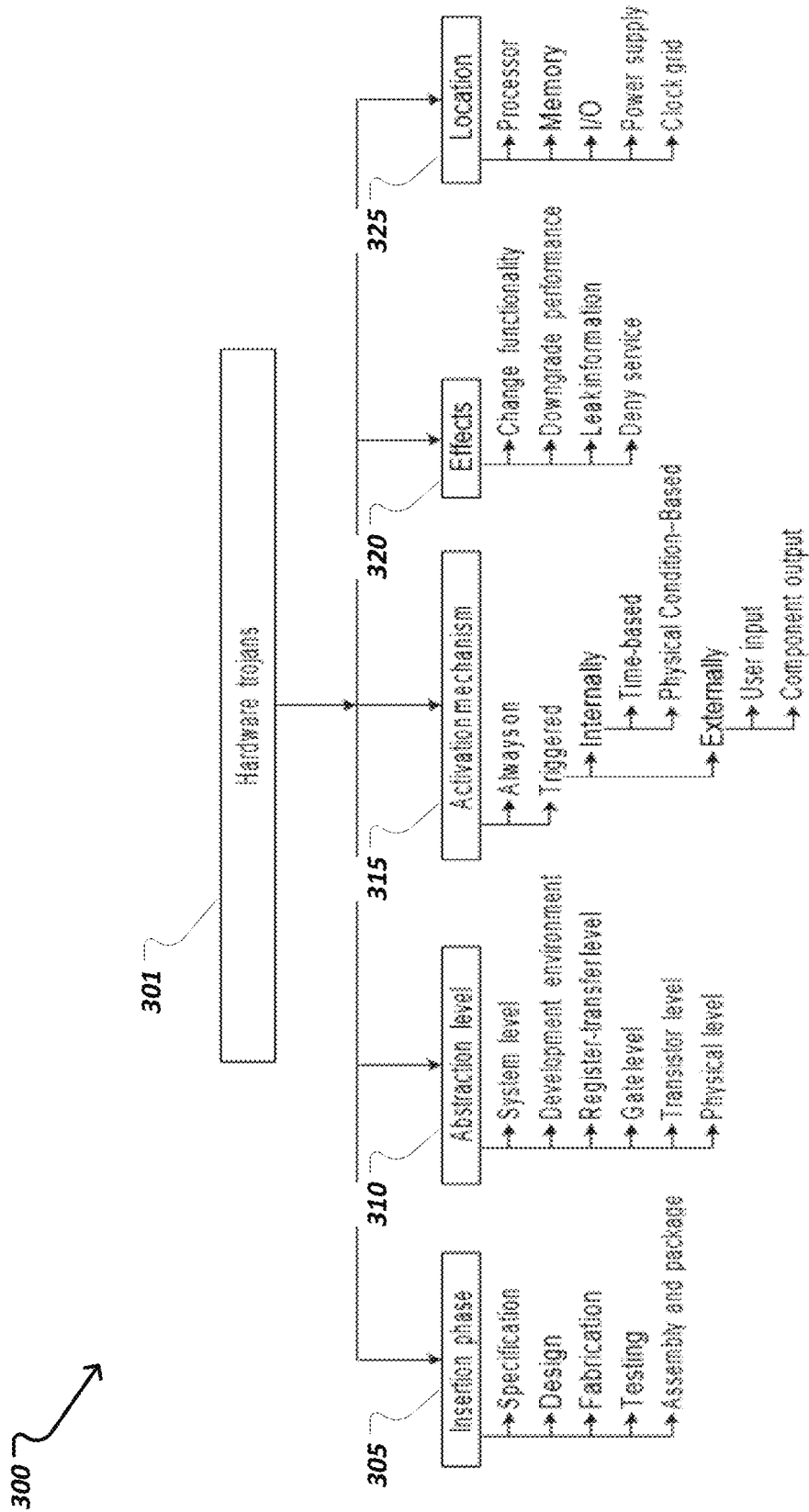
FIG. 3 illustrates an example taxonomy of unintentional design flaws (i.e., hardware Trojans) which can be detected according to the information flow techniques of FIGS. 1-2.

FIG. 3 illustrates an example taxonomy of unintentional design flaws, namely hardware Trojans 301, which can be detected according to the information flow techniques disclosed herein. As an example, third party IP cores may contain hardware Trojans 301 that are activated only under rare conditions to leak sensitive information (such as the plaintext) or violate the integrity of critical data (e.g., the secret key); otherwise they run normally and produce correct results. The hardware Trojans 301 are carefully designed and are hard to activate through pure functional testing. The disclosed techniques access the RTL code or gate level netlist of the IP cores. Therefore, knowledge about the implementation details of the trigger condition or payload of the Trojans is not required.

FIG. 3 shows various types of hardware Trojans 301 can be targeted, and the Trojan taxonomy 300 is illustrated. As a general description, the Trojan taxonomy has various categories including, but not limited to: insertion phase 305; abstraction level 301; activation mechanism 315; effects 320; and location 325. The systems and techniques disclosed can be designed to detect hardware Trojans at the register-transfer level and the gate level, shown under abstraction level 310 category. Also, Trojans inserted in the specification and design phases, illustrated in FIG. 3 under the insertion phase 305, can be detected. Moreover, Trojans under the categories of activation mechanism 315, effects 320, and location 235 can be detected in accordance with the disclosed techniques. The Trojans can be either always on or triggered (shown under the activation mechanism 315 category) under specific conditions, (e.g., single input, input sequence, or counter). Thus, the attacks can cause violation of confidentiality or integrity properties of critical data. Is some cases, a design consideration assumes the attacker's primary goal is to learn sensitive information (and does not account for threats that cause a denial of service or downgrade performance). The disclosed techniques can be designed to focus on Trojans that perform logical attacks and thus do not consider those that leak information through power, electromagnetic, and other side channels.

Additionally, disclosed techniques may uncover cases where IP cores have intended or unintended functionality that can be exploited in an attack against the specified security property. For instance, the techniques can be configured to detect malicious insertions of Trojans. Various other known security vulnerabilities exist. For example, design errors can be just as dangerous in terms of the security of the hardware. Thus, the techniques, including information flow technologies, are applicable for both malicious (Trojans) and non-malicious (design flaw) scenarios. Implementations involving some non-malicious aspects of hardware security are disclosed in U.S. patent application Ser. No. 15/141,392 entitled "GENERATING HARDWARE SECURITY LOGIC", filed Apr. 28, 2016, which is incorporated herein by reference in its entirety.

Figures 4A, 4B:
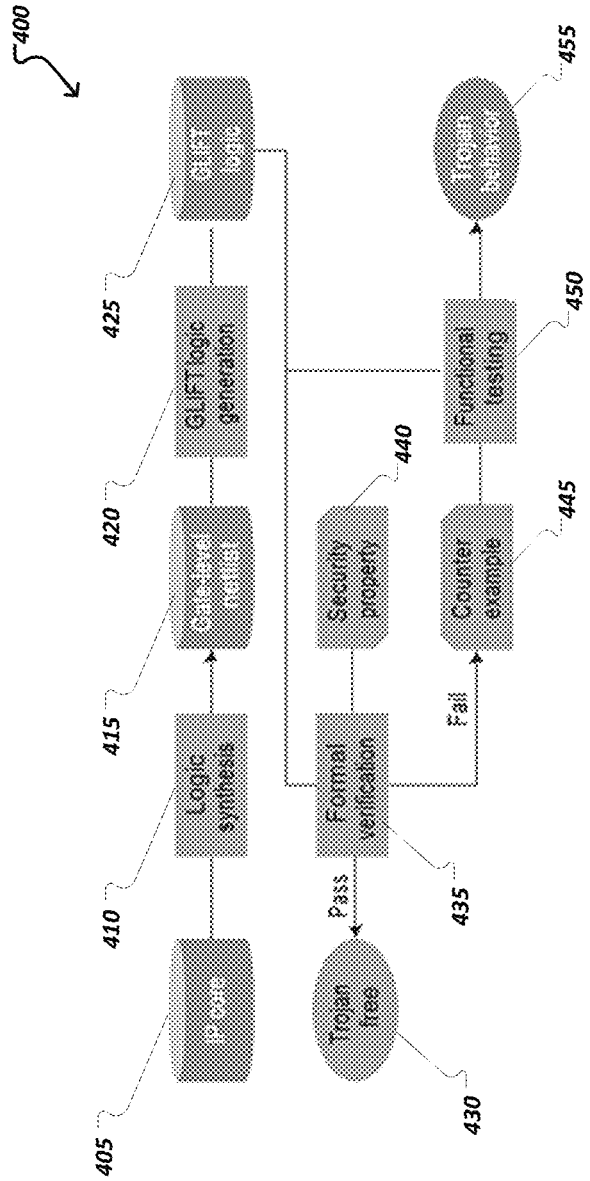
FIG. 4A illustrates a diagram of an example process for implementing the detection of unintentional design flaws using the information flow techniques of FIGS. 1-2.
FIG. 4B illustrates a table including an example label propagation policy that can be implemented for information-flow tracking.

FIG. 4A shows a diagram of an example process 400 for implementing information-flow tracking (IFT) to detect unintentional design flaws in a gate-level design. Some existing detection techniques focus on detecting hardware Trojans in fabricated hardware. In contrast, the disclosed techniques employ a strategy involving catching potential vulnerabilities that could signal a Trojan during the design phase, when the attacks are much easier to eliminate or mitigate. In an implementation, illustrated in FIG. 4A, information-flow tracking (IFT) is used to detect Trojans in gate-level design. IFT can be widely deployed across the system stack—from programming languages and compilers to instruction-set architecture. Furthermore, IFT can be used to prove important security properties, such as those related to confidentiality and integrity.

As illustrated in FIG. 4A, GLIFT can be employed as the IFT technology. In this case GLIFT can precisely measures and controls all logical flows from Boolean gates. Moreover, GLIFT can be used to craft secure hardware architectures and detect security violations from timing channels. Also, GLIFT can be used to formally verify that an information flow adheres to security properties related to confidentiality and integrity. Alternatively, various IFT technologies, other than GLIFT, can be used to implement the disclosed techniques. Counterexamples found during formal verification reveal harmful information flows that point to design flaws or malicious hardware Trojans that cause the system to leak sensitive information and violate data integrity. The designer can then take the appropriate action to correct the vulnerability that led to the violation. An understanding of malicious Trojan behaviors is useful in backtracking analysis to identify the Trojan design.

The techniques diagramed in FIG. 4A can be generally characterized as having three main parts: information flow tracking (e.g., GLIFT), detection of unintentional design flaws (e.g., hardware Trojans), and the derivation of security theorems to formally prove properties. FIG. 4A illustrates a logic synthesis 410 tool that compiles an IP core 405 design to a gate-level netlist 415. Thereafter, the gate-level information-flow tracking (GLIFT) logic 420 is automatically generated. Each gate is mapped to a GLIFT logic library 425, which can be completed in linear time. The GLIFT logic is formally verified 435 against a security property 440 that the designer has written. If it passes verification (as illustrated by the arrow labeled Pass) there is no Trojan 430. If it does not (illustrated by the arrow labeled Fail), a counterexample 445 is generated, which is used to functionally test 450 the GLIFT logic to derive Trojan behavior 455.

In some implementations, security property 440 can specify certain confidentiality properties. For example, a confidentiality property can require that secret information never leak to an unclassified domain. A security property 440 can additional specify integrity property. As another example, an integrity property requires that untrusted data never be written to a trusted location. Some existing hardware description languages (HDLs) are inadequate for enforcing such security properties because they specify only functionality. In contrast, information-flow analysis is related to data movement.

Technique 400 can include generating an information flow model based on the specified security property 440. In some cases, a security requirement for modeling confidentiality and integrity properties can require knowing what should be protected. Accordingly, an initial step in modeling can be to associate additional sensitivity information with data objects. In practice, these objects can have security labels at multiple levels according to sensitivity. For example, in a military information system, data can be labeled as unclassified, confidential, secret, or top secret.

As discussed in detail in reference to FIG. 2, the partial order between different security classifications can be defined using a security lattice. Let L (•) denote the function that returns the security label of a variable, which can be formalized as:

$$A \rightsquigarrow B \Leftrightarrow L(A) \sqsubseteq L(B) \qquad (1)$$

Equation 1 can model confidentiality and integrity properties by specifying allowed information flows; in this case, information is allowed to flow from A to B if and only if A's security level is lower than or equal to B's. Under such a notion, both the confidentiality and integrity properties can be modeled in a unified manner. In some implementations, a two-level security lattice is used, for instance LOW HIGH. In a confidentiality analysis, sensitive data is labeled HIGH and unclassified data is LOW, but in an integrity analysis, critical data is labeled LOW and normal data is HIGH. For example, the technique 400 can operate to label the secret key as HIGH in a confidentiality analysis but LOW in an integrity analysis.

The information flow tracking aspects of the method 400 can assign a label (also known as a taint) to each bit of hardware design data. These assignments provide the basis for an information flow model that designers can use to better understand how that data propagates through the design. Designers can then define security properties 440 and use GLIFT to test or verify if the design adheres to them.

Suppose, for example, that a detection goal is to understand where information about the cryptographic key could potentially flow. In this scenario, GLIFT functions to assign a label "confidential" to bits of the key, and the designer or test engineer can then write a security property 440 that precludes some part of the design from accessing those bits. As an example, the security property 440 can be (described in natural language), "Untrusted memory location X should never be able to ascertain any confidential information." Restated, the security property 440 specifies that the untrusted memory location can never be assigned a confidential label.

In the case of implementing GLIFT as shown in FIG. 4A, the IFT technique associates each data bit with a security label (rather that a byte or word-level label). Thus, allowing GLIFT to precisely account for information flow. In this case GLIFT can identify that information flows from bit A to bit B if and only if A's value influences B. Also, unlike some other IFT methods, GLIFT accounts for the input data values when calculating the output label. Other IFT methods mark the output as HIGH if there is at least one HIGH input regardless of the input data values. With these characteristics, GLIFT can determine the output's security label more precisely than other IFT methods and thus more accurately measure actual information flows.

As another example, GLIFT is capable of considering AND-2, a two-input AND gate whose Boolean function can be described as O=A·B. Let At, Bt, and Ot denote the security taints of A, B, and O, where A, B∈{0, 1}, and At, Bt, Ot E {LOW, HIGH} under some encoding scheme (for example, LOW=0 and HIGH=1) where $$\text{LOW·HIGH=LOW and}$$

$$\text{LOW+HIGH=HIGH} \quad (2)$$

FIG. 4B shows a table including an example label propagation policy that can be implemented in information-flow tracking (IFT) methods. The table 470 shows the label-propagation policy of conservative IFT methods and GLIFT for AND-2. Some conservative IFT methods can typically set Otto HIGH when either A or B is labeled HIGH. This policy is characterized as conservative, or safe, in that it accounts for all possible flows of HIGH information, but it can cause many false positives (nonexistent flows) in information-flow measurement. To illustrate, in a case where labeling lets Secret be a 32-bit HIGH value. After performing $$\text{Public=Secret·0x01,} \quad (3)$$

Conservative methods, in some cases, will mark the entire Public as HIGH, indicating that 32 bits of information are flowing from Secret to Public.

However, GLIFT uses a more precise label-propagation method for AND-2. The output will be LOW (or HIGH) when both inputs are LOW (or HIGH). When there is only one LOW input and it is (LOW, 0), the output will be dominated by this input and will be LOW (the other HIGH input does not flow to the output). When the input is (LOW, 1), the output will be determined by the other HIGH input and thus will take a HIGH label.

In an example employing Equation 3, the constant (LOW, 0) bits in the second operand will dominate the corresponding label bits of Public as LOW. Only the constant (LOW, 1) bit allows the least significant bit of Secret to flow to the output. Thus, there is only 1 bit of information flow. These examples, and the comparison illustrated in FIG. 4B, serve to show that GLIFT considers both the security label and the actual value in its propagation, thus accounting for how an input value can influence output and more precisely measuring the actual information flows.

As illustrated in the diagramed method 400, the techniques can employ information tracking to accomplish hardware Trojan detection. because both the gate-level netlist 415 and GLIFT logic 425 library can be described with a standard HDL, off-the-shelf EDA tools can be used to verify or test GLIFT logic. This feature contrasts sharply with some other existing hardware threat detection methods, which may require the designer to construct a formal hardware design model before specifying and proving properties. GLIFT is configured to automatically provide that formal model, realizing advantages of further streamlining the security verification process (e.g., ease of use, increased speed).

In some cases, a designer can write security properties 440, which are translated into standard HDL assertion statements and verification constraints and input along with the GLIFT logic 420 to a standard hardware-verification tool, shown as formal verification 435. If the design satisfies all the properties (e.g., Pass), it is free of Trojans 430 that violate those properties. Otherwise, formal verification 435 will fail and provide a counterexample 445 that causes the security violation. The counterexample 445 enables functional testing 450 on GLIFT logic, which determines the exact Trojan behavior 455. It is then possible to identify Trojan behavior across the design.

GLIFT can be used in broadening the properties that formal tools can check. In some scenarios that do not employ GLIFT, formal tools can check only functional properties on netlists, such as the possibility that signal X can take value Y. It is difficult to express security properties solely for the functional design because values do not reveal how information flows. In employing GLIFT in the detection method 400, data is associated with additional security labels, which enables reasoning about the design's security. Consequently, GLIFT can precisely capture when information-flow security properties related to confidentiality and integrity are violated, such as whether sensitive data is multiplexed to a publicly observable output.

According to an implementation, the security theorems can be derived in two steps. The first step includes classifying the signals in the hardware design into different security levels. For example, the classification and labeling in FIG. 5A can be used. FIG. 5A displays a table that includes examples of classification and labeling employed for confidentiality analysis and integrity analysis aspects of the disclosed embodiments.

The next step is to use the labels to specify allowable (or forbidden) information flows. In this case, a designer can write a property to enforce the requirement that HIGH data should never flow to LOW data. The properties mark the input signals and specify which signals must be checked against their labels. As an example, the first property to check for cryptographic cores, is that the key always flows to the ciphertext. To derive a security theorem for this property, the key can be marked as HIGH and all the remaining inputs as LOW and check that the ciphertext is always HIGH. An example of a security theorem for this property can be described as:

| | |
|---|---|
| set key_t | HIGH |
| set DEFAULT_LABEL | LOW |
| assert cipher_t | HIGH |

Another example of a security theorem for a property specifying the case in which the key should never be altered can be described as:

| | |
|---|---|
| set key_t | LOW |
| set DEFAULT_LABEL | HIGH |
| assert key_reg_t | LOW |

In the abovementioned security theorem, the key is labeled LOW and all remaining inputs are labeled HIGH because this property is related to integrity. To ascertain if the property holds, the designer checks that the key register's security label is always LOW. Other theorems used to enforce security properties can be similarly derived, easily converted to assertion language statements, and proved using standard hardware-verification tools. Again, this ease of use contrasts sharply with some other hardware Trojan detection methods that require each design to be described in new semantics. Thus, the disclosed techniques realize the dual advantage of eliminating these semantic differences and minimizing the burden on designers to write descriptions.

FIG. 5B shows a table 550 including example results of designs from trust-HUB tested using the techniques for detecting unintentional design flaws, as disclosed herein. FIG. 5B displays table 550 summarizing the trust-HUB benchmarks tested showing the time for GLIFT logic generation and proving Trojan detection. From specified test and security constraints, results displayed in FIG. 5B were obtained from observing the security labels of primary outputs (without manipulating the benchmarks' internal registers). For the AES-T100, T1000, T1100, and T1200 benchmarks, as shown in FIG. 5B, the disclosed methods successfully bypassed the trigger conditions because the leakage points were XOR gates, which always allow security labels to propagate regardless of input values. As table 550 shows, for the AES-T400, AES-T1600, AES-T1700, RSA-T100, and RSA-T200 benchmarks, the disclosed method detected Trojans and identified leakage points in less than 10 minutes.

Two examples, the AES-T1700 and RSA-T400 benchmarks, demonstrate how the disclosed method can detect Trojans and reveal potentially malicious behaviors that functional testing and verification might fail to capture.

Figure 6A:
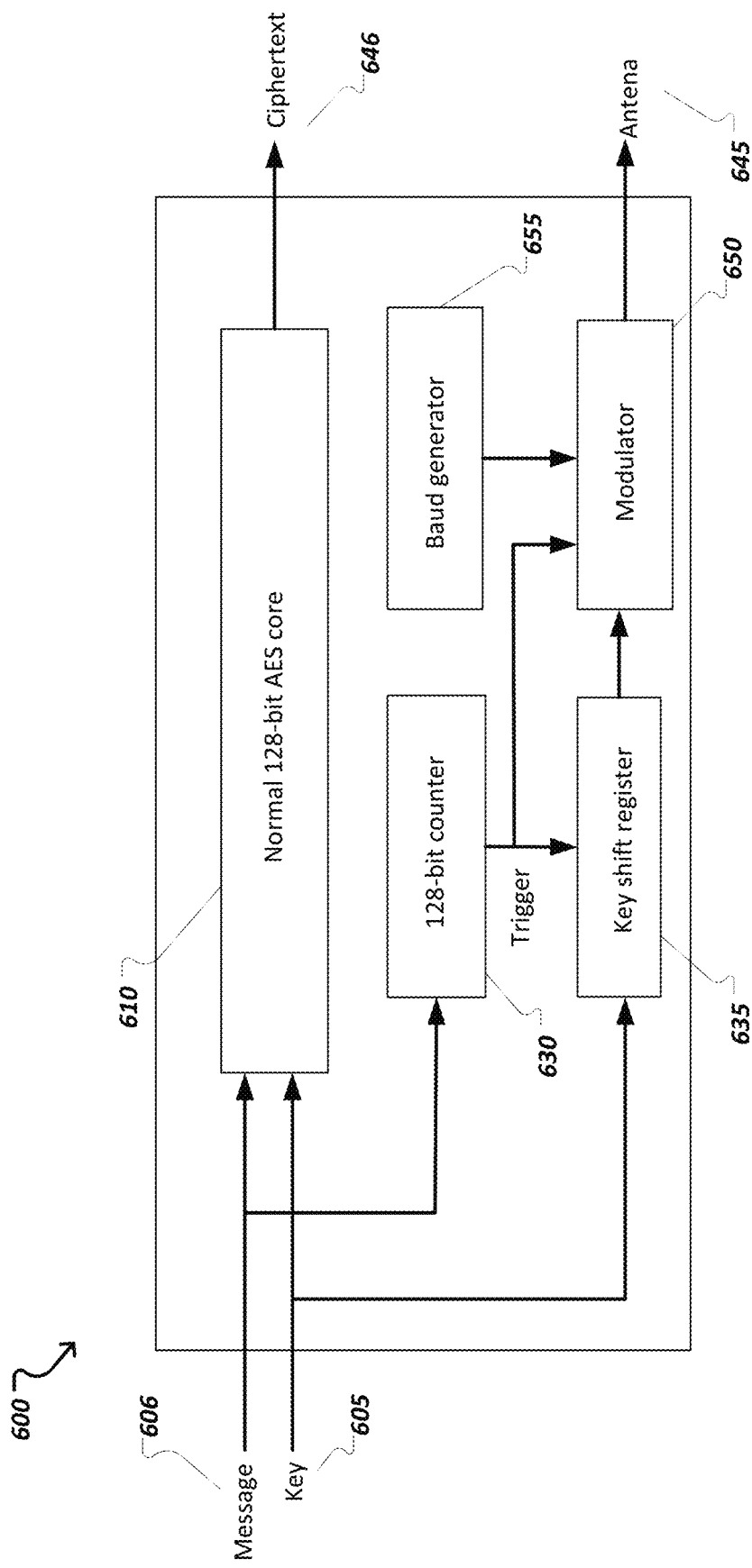
FIG. 6A is a diagram of an example benchmark used to evaluate performance of techniques for detecting unintentional design flaws of FIG. 4A.

FIG. 6A is a diagram of an example benchmark 600 used to evaluate performance associated with the disclosed hardware Trojan detection techniques. The example benchmark 600 in FIG. 6A is the AES-T1700. The example AES-T1700 benchmark 600 is diagramed as including various components, including, but not limited to: normal 12-bit AES core 610; 128 bit-counter 630; key shift register 635; Baud generator 655; modulator 650; and antenna 645. As shown in FIG. 6A, the benchmark 600 receives a message 606 and a key 605 as input, and outputs ciphertext 646.

In an example, the AES-T1700 benchmark contains a Trojan that leaks the key 605 bits through a modulated RF channel. The Trojan activates after $(2^{129}-1)$ successive encryption operations. Once activated, it loads the secret key 605 into a shift register 635, whose least significant bit is modulated using modulator 650 to leak through the RF channel. The probability of activating such a Trojan in functional testing can be quite low. Therefore, to check the confidentiality property against key leakage, the key can be marked as HIGH and all the remaining inputs as LOW. An assertion statement can be written that an output can be HIGH so that it could be determined if the key flows to that output. In an initial analysis, it is identified that both outputs, the ciphertext 646 and Antena signal from Antena 645, can have HIGH labels. The subsequent analysis focused on the Antena output, as it is normal for the key to flow to the ciphertext 646 in a cryptographic function. Then, a Boolean satisfiability (SAT) solver is used to prove that Antena_t (Antena's label) is always LOW. In the case where the proof failed, it indicates that Antena_t could be HIGH and thus that Antena 645 output could leak information about the key 605.

As a further example, Mentor Graphics' Questa can be used to check if the internal registers in the model found by the SAT solver could meet the required conditions (SAT tools typically perform only com-binatorial checks). The SHIFTReg_t register was the focus of the check because it was the only register that could carry HIGH information, according to the SAT solver's model. Questa can be used to formally prove that the SHIFTReg_t register was always LOW. In cases when the control point signal Tj_Trig was asserted, the proof failed.

Figure 6B:
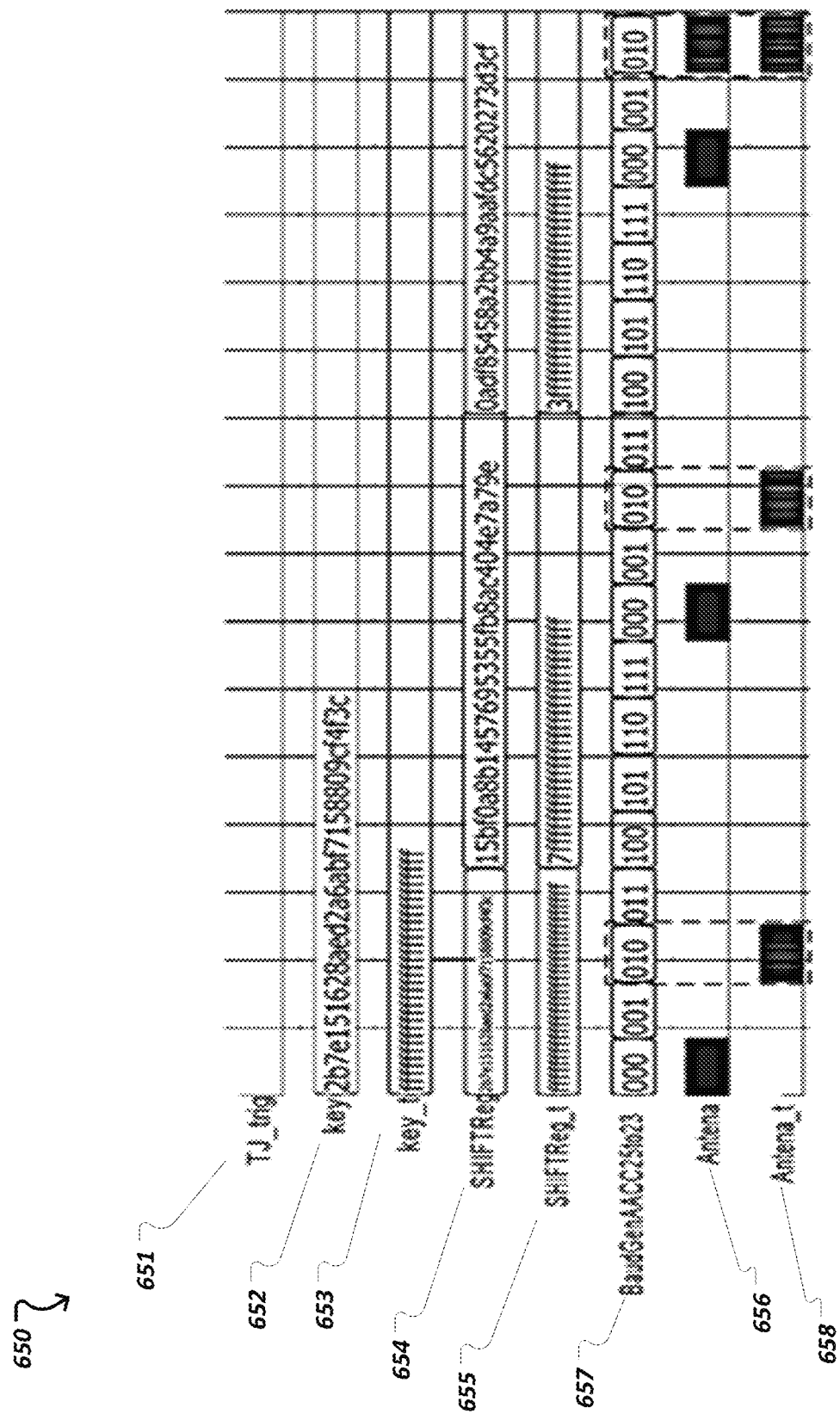
FIG. 6B is a diagram of example results from GLIFT logic simulation in accordance with the disclosed techniques.

FIG. 6B is a diagram of example results from GLIFT logic simulation 600 in accordance with the disclosed techniques. In some cases, a goal of a simulation 600 is to reveal how the key 652 leaks to the Antena 657 output. The key 652 flows to the Antena 657 signal, when Antena_t 658 is HIGH, denoted by the black rectangles within the boxes with dashed lines, which denote the times when Antena_t 658 is HIGH. To have no leakage, Antena_t 658 must always be LOW.

The simulation 600 results serve to illustrate that GLIFT precisely captures when and where key 652 leakage happened (which functional testing and verification could not do). A designer could use these results to identify the location of Trojans throughout the design by using formal proofs on the GLIFT logic to backtrack from Antena to the key.

Figure 7:
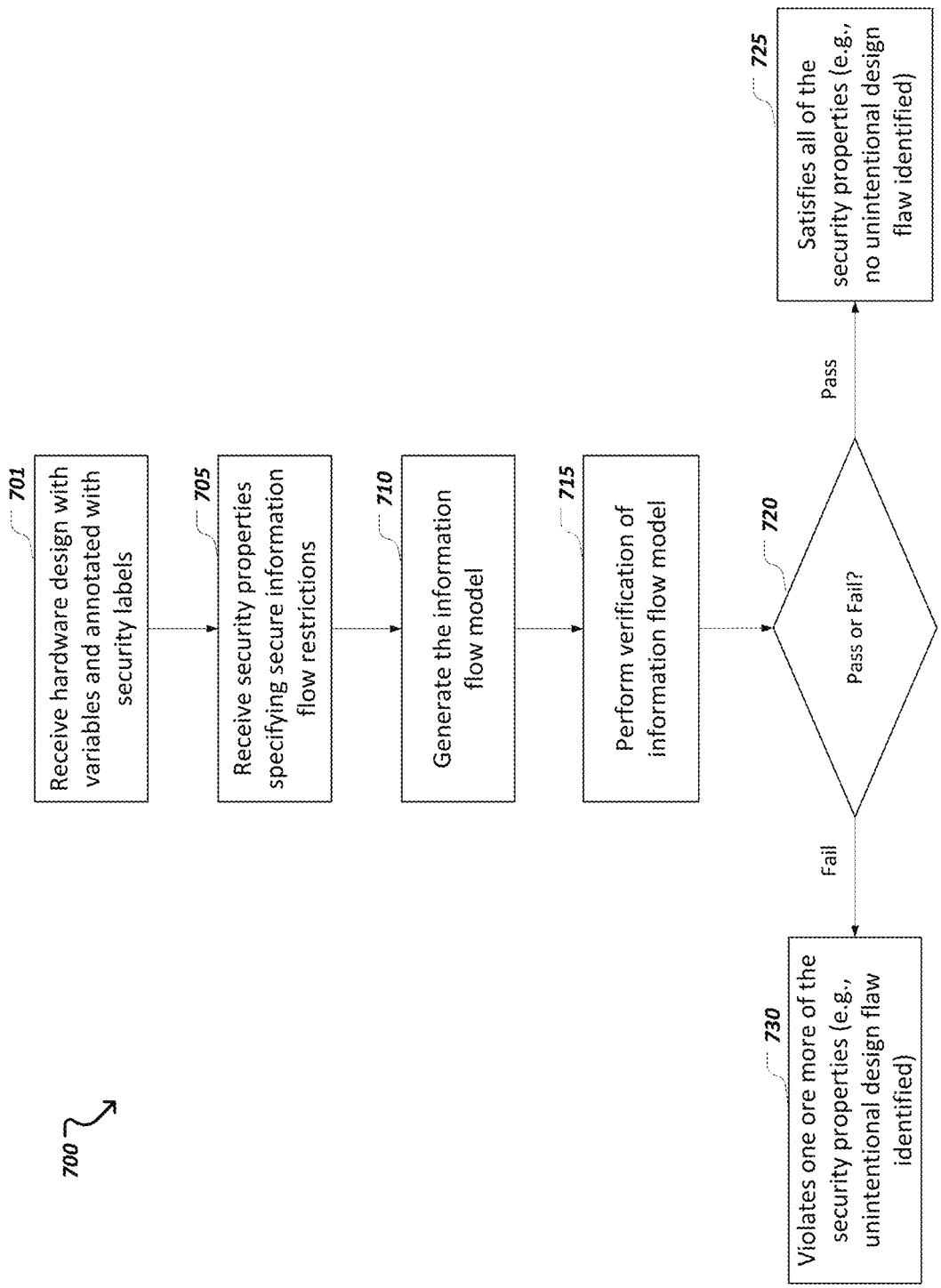
FIG. 7 is a flow diagram of an example process implementing the detection of unintentional design flaws using the information flow techniques.

FIG. 7 illustrates a block diagram of an example process 700 employed to implement information flow tracking technology for unintentional design flaw (e.g., hardware Trojan) detection. According to the embodiments, a data processing apparatus (shown in FIG. 8) can be employed for performing the functions of the described process. A hardware design for an IC chip implementation, for example, is received 701. Receiving the hardware design can include generating a source code including multiple variables, using a HDL, for instance, to specify the circuit configuration. In the implementations, the received hardware design is annotated with at least one security label. The security labels may provide more natural language terminology for the variables in the hardware design, thereby increasing the ease of use in the hardware design process. In some cases, the hardware associated with the hardware design received at 701 can include a Trojan having malicious behaviors that potentially affect the security of information flow (e.g., leaking key bits).

In the embodiments, security properties are received 705 for specifying restrictions in a secure information flow implementation. Receiving the security properties can include specifying information flow control for the hardware design, such as outlining restrictions pertaining to how information is allowed to flow between components of the circuit. In some cases, confidentiality and integrity properties are received as specified with the security properties at 705.

Additionally, the embodiments implement receiving security properties in a high-level security language, for example Tortuga Logic's Sentinel language, as coded by a designer. Security labels are designated to a corresponding security level in accordance with the information flow restrictions, as specified in the security properties. In some implementations, the security level designations are determined, or otherwise evaluated, using information flow control mechanisms such as ordering the security labels within a security lattice. Thus, in some implementations, designating security levels for security labels includes generating an ordering structure of at least two levels, such as a security lattice.

Thereafter, an information flow model is generated 710 based on the received security properties. Generating the information flow model involve utilizing the security levels for automatically assigning a respective value to each corresponding security label in a hardware design. The values assigned to particular security labels can be determined in accordance with the security levels. Accordingly, an automated process of assigning values (e.g., corresponding to security values) to security labels within a hardware design is employed.

For example, a security label annotating a hardware design can be assigned a value that is consistent with the security properties, without the need for manually setting bits by a hardware engineer. In some implementations, automatically assigning values to security labels within a hardware design is an operation performed by a synthesizer, or logic synthesis tool, which further includes translating the security properties received in a high-level language into a gate level hardware logic. In some cases, generating the information flow model at 710 involves translating security properties into standard HDL assertion statements and verification constraints. As a result, the confidentiality and integrity properties, as specified with the security properties, can be modeled by using the information flow model generated at 710.

Thus, the techniques as described in connection with FIG. 7, implements specifying information security properties at a higher level of abstraction, and generating a precise gate-level information-flow model that can be described with a standard hardware description language.

Next, verification of the information flow model is performed 715. At 715, security properties, which are translated into standard HDL assertion statements and verification constraints and input along with the GLIFT logic to a standard hardware verification tool. The verification tool is configured to perform check 720, in order to determine whether the information flow model passes or fails against the specified security properties.

In the case where the design satisfies all the properties (Pass), the verification can determine that an unidentified design flaw, such as hardware Trojan, is not identified 725. Restated, the formal verification determines that the design is free of Trojans that violate the specified properties.

Alternatively, in the case where the design does not satisfy all the properties (Fail), the formal verification will fail and determines that an unintentional design flaw, or hardware Trojan, is identified 730. In some embodiments, based on the formal verification's determination of pass or fail, additional operations can be performed, including but not limited to: generating a counterexample, functional testing (on GLIFT logic), and determining exact Trojan behavior.

Figure 8:
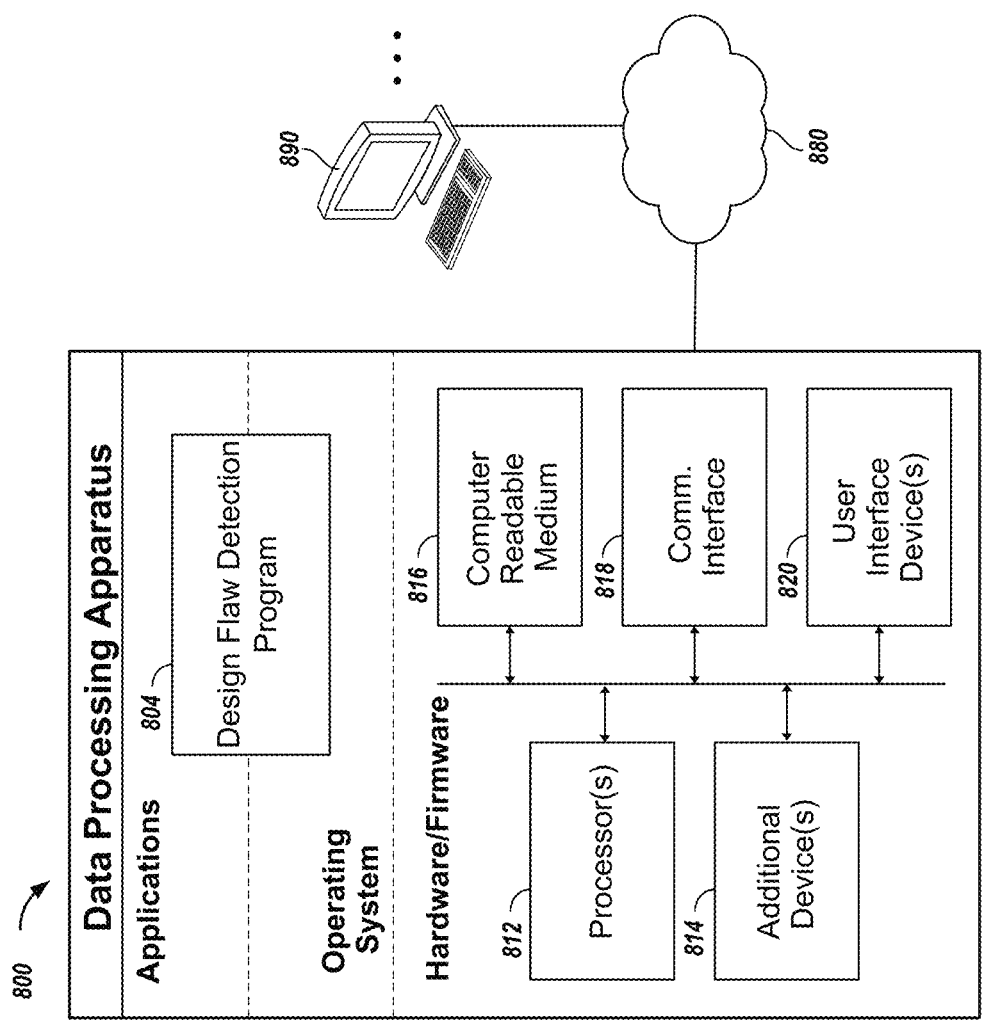
FIG. 8 is a schematic diagram of a data processing system.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services for hardware design involving specifying an implementation of an electronic circuit or microprocessor, such as HDL programs, and synthesizers for translating logic operations specified in a high-level security language into a hardware security logic, for example. In some implementations, the data processing apparatus 800 includes a Design Flaw Detection Program 804 that can implement the systems and techniques described above and variations thereof for programming, or otherwise implementing information-flow tracking to detect unintentional design flaws, for instance hardware Trojans, in a hardware design.

The Design Flaw Detection Program 804 can be configured to implement various information flow tracking, detection, and security theorem derivation aspects of the embodiments further described in connection with FIGS. 1-7 and variations thereof. For example, the program 804 can implement a high-level programming language using systems and techniques for specifying secure information flow and/or security properties. Regardless, of the operational details, the number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses its communication interface 818 to communicate with one or more computers 890, for example, over a network 580. In some implementations, the computers 890 can be employed to execute logic analysis functions, such as formal verification and emulation. Examples of user interface devices 520 include a display, a camera, a speaker, a microphone, a tactile feedback device, a keyboard, and a mouse. The data processing apparatus 800 can store instructions that implement operations as described above, for example, on the computer readable medium 816 or one or more additional devices 514, for example, one or more of a floppy disk device, a hard disk device, an optical disk device, a tape device, and a solid state memory device.

The techniques disclosed herein realize the advantages of utilizing GLIFT for the detection of unintentional design flaws, including detecting hardware Trojans. The systems and techniques provide a formal mechanism for detecting hardware Trojans that can cause violations in information-flow security properties as well as a means of capturing Trojan behavior. Relative to some other existing detection approaches, the disclosed embodiments can increase ease of use because there is no requirement to rewrite the design in a formal language.

Various results, as displayed in FIG. 6B for example, serve to illustrate that the systems and techniques disclosed herein effectively detects Trojans, or other malicious attacks, that can cause undesirable information flow either through a maliciously modified datapath or covert side channel. Also, the techniques can account for logical information flows and further identifies Trojans that can cause violation of information-flow security properties related to confidentiality and integrity.

In some embodiments, the security design process includes a formal language can be used to specify important security properties and then map them to information flow properties. Also, in the instances where designs have security properties in common, some implementations can use a library of shared properties. Accordingly, the library can easily leveraged across designs. Furthermore, it should be appreciated that the embodiments are not limited to the detection of hardware Trojans, malicious attacks, or unintentional design flaws, and can also be employed for identification and mitigation of non-malicious design flaws.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an Application Specific Integrated Circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method performed by data processing apparatus, the method comprising:
    receiving a hardware design specifying an implementation for information flow in a hardware configuration, wherein the hardware design comprises at least two variables that represent respective hardware structures related to one another by the hardware design, and wherein the hardware design includes gate-level information-flow tracking logic for the hardware structures represented by the variables,
    wherein the gate-level information-flow tracking logic is associated in the hardware design with labels corresponding to each of the variables and one or more label propagation rules that specify under what conditions a value of one label should be propagated by the gate-level information-flow tracking logic to another label;
    receiving one or more security properties expressed in a high-level security language for the gate-level information-flow tracking logic labels corresponding to the variables in the hardware design;
    generating an information flow model, wherein generating comprises translating the one or more security properties expressed in the high-level security language into conditions that indicate whether the information flow model violates the one or more security properties;
    performing a verification process using the information flow model and the label propagation rules to determine whether the information flow model violates the one or more security properties expressed in the high-level security language;
    upon determining that the information flow model violates the one or more security properties, determining that an unintentional design flaw is identified in the hardware design; and
    in response, generating a counterexample that identifies a security property violated by the unintentional design flaw in the hardware design during the verification process.

2. The method of claim 1, further comprising designating the unintentional design flaw as a hardware Trojan.

3. The method of claim 2, wherein the hardware Trojan is an insertion phase hardware Trojan, an abstraction level hardware Trojan, an activation mechanism hardware Trojan, an effects hardware Trojan, or a location hardware Trojan.

4. The method of claim 1, wherein the generated counterexample identifies a location in the hardware for functional testing of a hardware Trojan.

5. The method of claim 1, wherein generating the information flow model comprises generating, based on the one or more security properties, an ordering structure specifying a hierarchical order comprising at least two security levels.

6. The method of claim 5, wherein the conditions that indicate whether the information flow model violates the one or more security properties uses the generated ordering structure.

7. The method of claim 6, wherein the hierarchical order of the at least two security levels comprises a higher security level corresponding to a more restricted label specified in a first security property and a lower security level corresponding to a less restricted label specified in the first security property.

8. The method of claim 6, further comprising generating the ordering structure as a security lattice.

9. The method of claim 1, wherein translating the one or more security properties into conditions that indicate whether the information flow model violates the one or more security properties comprises generating one or more assertion statements in a hardware description language.

10. The method of claim 1, wherein performing the verification process comprises using an electronic design automation tool.

11. A system comprising:
    one or more computers and one or more storage devices storing instructions that are operable, when executed by the one or more computers, to cause the one or more computers to perform operations comprising:
    receiving a hardware design specifying an implementation for information flow in a hardware configuration, wherein the hardware design comprises at least two variables that represent respective hardware structures related to one another by the hardware design, and wherein the hardware design includes gate-level information-flow tracking logic for the hardware structures represented by the variables,
    wherein the gate-level information-flow tracking logic is associated in the hardware design with labels corresponding to each of the variables and one or more label propagation rules that specify under what conditions a value of one label should be propagated by the gate-level information-flow tracking logic to another label;
    receiving one or more security properties expressed in a high-level security language for the gate-level information-flow tracking logic labels corresponding to the variables in the hardware design;
    generating an information flow model, wherein generating comprises translating the one or more security properties expressed in the high-level security language into conditions that indicate whether the information flow model violates the one or more security properties;
    performing a verification process using the information flow model and the label propagation rules to determine whether the information flow model violates the one or more security properties expressed in the high-level security language;

upon determining that the information flow model violates the one or more security properties, determining that an unintentional design flaw is identified in the hardware design; and in response, generating a counterexample that identifies a security property violated by the unintentional design flaw in the hardware design during the verification process.

12. The system of claim 11, wherein the operations further comprise designating the unintentional design flaw as a hardware Trojan.

13. The system of claim 12, wherein the hardware Trojan is an insertion phase hardware Trojan, an abstraction level hardware Trojan, an activation mechanism hardware Trojan, an effects hardware Trojan, or a location hardware Trojan.

14. The system of claim 11, wherein the generated counterexample identifies a location in the hardware for functional testing of a hardware Trojan.

15. One or more non-transitory computer storage media encoded with computer program instructions that when executed by one or more computers cause the one or more computers to perform operations comprising:

receiving a hardware design specifying an implementation for information flow in a hardware configuration, wherein the hardware design comprises at least two variables that represent respective hardware structures related to one another by the hardware design, and wherein the hardware design includes gate-level information-flow tracking logic for the hardware structures represented by the variables, wherein the gate-level information-flow tracking logic is associated in the hardware design with labels corresponding to each of the variables and one or more label propagation rules that specify under what conditions a value of one label should be propagated by the gate-level information-flow tracking logic to another label;

receiving one or more security properties expressed in a high-level security language for the gate-level information-flow tracking logic labels corresponding to the variables in the hardware design;

generating an information flow model, wherein generating comprises translating the one or more security properties expressed in the high-level security language into conditions that indicate whether the information flow model violates the one or more security properties; and performing a verification process using the information flow model and the label propagation rules to determine whether the information flow model violates the one or more security properties expressed in the high-level security language;

upon determining that the information flow model violates the one or more security properties, determining that an unintentional design flaw is identified in the hardware design; and in response, generating a counterexample that identifies a security property violated by the unintentional design flaw in the hardware design during the verification process.

* * * * *